March 6, 1962 J. PICKLES 3,023,648
PRESSURE ROLLERS
Filed May 25, 1959
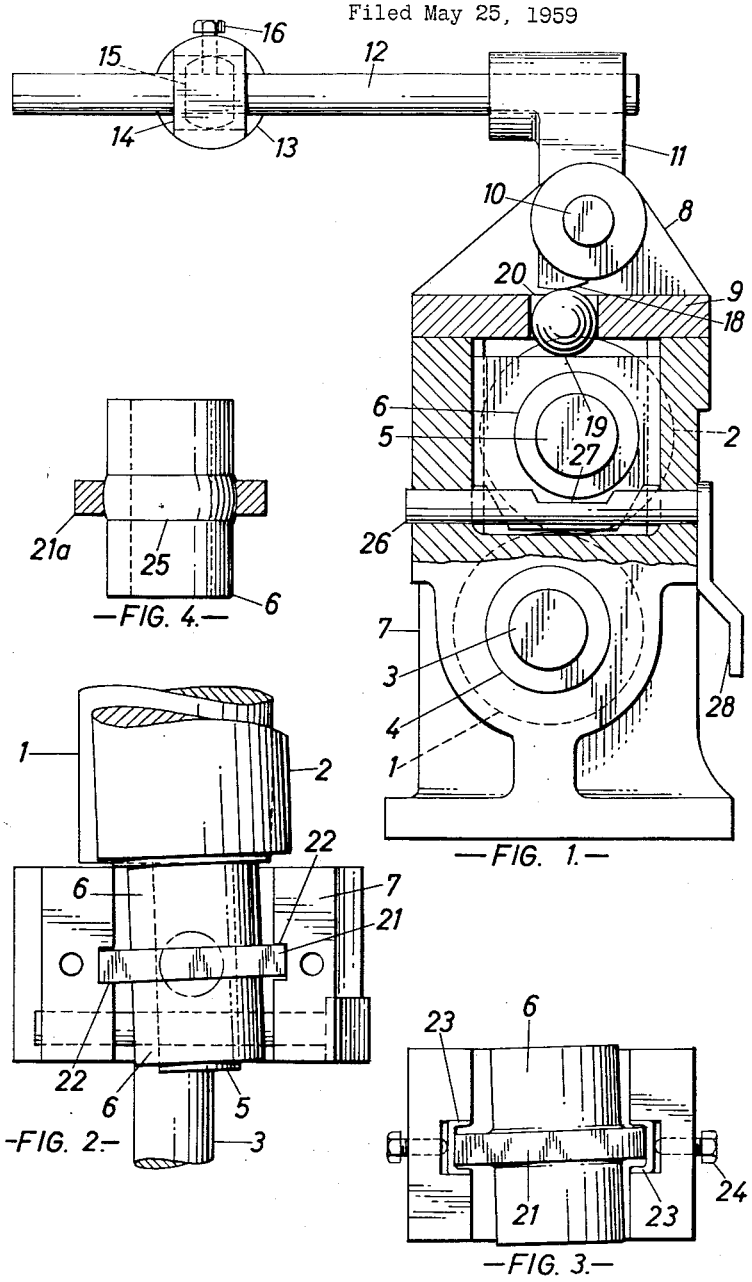

United States Patent Office 3,023,648
Patented Mar. 6, 1962

3,023,648
PRESSURE ROLLERS
John Pickles, Huddersfield, England, assignor to Carding Specialists (Canada) Limited, Toronto, Ontario, Canada, a corporation of Canada
Filed May 25, 1959, Ser. No. 815,700
Claims priority, application Great Britain June 5, 1958
4 Claims. (Cl. 80—31.1)

This invention relates to pressure rollers and particularly to means for setting one roller in relation to another roller as desired. The invention is also particularly, but not exclusively, applicable to the pressure roller assembly disclosed in the specification of our prior British specification No. 697,106.

The main object of the present invention is to provide simple but efficient mechanical setting means for one roller in relation to another roller. Another object is to provide roller moving means.

Accordingly there is provided means for setting one roller longitudinally at an angle in relation to another roller, comprising a pair of setting plates or equivalent members for roller shaft end bearings, said bearings being off-set laterally in opposite directions a predetermined distance from a line passing through the centre of an adjacent roller shaft end, said off-set bearings being provided to receive the shaft ends of a pressure roller engaging a second roller, and each setting member being mounted to be capable of sliding adjustment in guides under the control of pressure-applying means applied to the member or other part to load the pressure roller in relation to the other roller.

Each bearing setting member can be mounted to allow lateral adjustment for setting its roller in angular relation to the co-operating roller. Such adjustment may be by shims or other packing elements or screw adjustment. Each member may have self-adjustment in angularity in guides.

A pair of rollers may be arranged to have the upper roller arranged lengthwise at an angle to the axis of the lower roller for their axes to cross at the centre of the length of the rollers and the shaft ends of the upper roller passing through off-set bearings forming part of guided end setting plates which enable the top roller to be set at a predetermined required angle to the bottom roller and bodily movable in relation thereto.

A pair of axially rotatable lifting members may be associated with the top roller of a pair of pressure rollers, of which the lower roller has its shaft ends mounted in fixed bearings, and the upper roller shaft ends mounted in slidable bearings under the control of pressure-applying means.

The rotatable lifting members may comprise a pair of rod-like members mounted one at each end of a roller transversely of the roller shaft ends, each member being at least partly rotatable about its axis and having a thrust part intermediate its ends adjacent the shaft end, and means for causing part axial rotation of the member so that the thrust part of the member will engage and apply a thrust directly or indirectly to the shaft end radially of the shaft axis and thus move the roller a predetermined distance away from its co-acting roller.

Each rod-like member may have a clearance recess or flat formed intermediate its ends so that the member section in this region is substantially of D-shape, whereby when the member is rotated about its axis the semi-circular part of the member will apply a thrust to the shaft or its bearing. Each rod-like member may be journalled in the bracket carrying the adjustable roller shaft bearings and have an operating lever fixed on one end for turning the member about its axis.

The invention will now be more particularly described with reference to the accompanying drawings in which:

FIG. 1 is a part-sectional view of one end mounting for a pair of rollers;

FIG. 2 is a plan view from above of FIG. 1 with a roller pressure-applying means removed;

FIG. 3 is a detail plan view of an alternative form of guide means; and

FIG. 4 is a detail plan view partly in section of an alternative bearing mounting.

In a particular embodiment of this invention for apparatus having a pair of superposed pressure rollers 1, 2, the lower roller 1 has its shaft ends 3 mounted in fixed bearings 4 and the upper roller 2 has its shaft ends 5 in guided bearings 6 capable of vertical movement. Such bearings 4, 6 at each end, are carried by a common mounting bracket 7 on which pressure-applying means are mounted by means of bracket 8. Such top bracket has a bottom plate 9 secured down on to the bearing bracket and its upstanding part is furnished with a horizontal pivot pin 10 on which is mounted a double-ended member 11 acting in the manner of a bell-crank lever. Each double-ended member has a part extending upwardly furnished with a horizontal boss into which is secured a rod-like arm 12 normally projecting substantially horizontally, e.g. it may project slightly upwardly to clear a machine part. Each arm requires loading and conveniently the two arms extending parallel with one another carry a common weight 13 in the form of a transverse bar which is slidably adjustable along the length of the arms for adjusting the loading. To allow for any inaccuracy between the angular positions of the two arms 12, the bar-weight 13 has slotted ends 14 (they may be bifurcated) each mounted on an arm 12 through a swivel bearing 15 for the weight to be self-adjusting. Means are provided for holding the weight in its set position and conveniently comprise set screws 16. The lower part of each double-ended member is shorter than the upwardly-extending part and terminates in a bottom face 18, curved in one direction, the centre of which is off-set from the axis of the pivot pin 10, of the double-ended member, on the side nearest to the loading weight 13. This face 18 of the double-ended member rests upon a ball 19 located in a vertical hole 20 through the bottom plate 9 of the pivot bracket 8 so that the ball is guided for vertical movement. Each ball rests upon the top edge of the setting plate 21 of bearing 6 for the top roller shaft end 5.

The details of the loading mechanism for the upper roll 2 as described are more specifically disclosed and claimed in a co-pending application Serial No. 815,699 filed May 25, 1959, now Patent No. 3,001,424.

The upper roller 2 has its end shaft bearings 6 formed integral with the end setting plates 21 which are slidably guided in grooves 22 provided in the brackets 7 and the bearings 6 are off-set from the axis of the lower roller to obtain a required axial angle of the upper roller 2 in relation to the bottom roller 1 so that their axes cross at the centre of the length of the rollers. This arrangement of crossed rollers is according to our prior British Patent No. 697,106. The set relationship of the two rollers is determined by the off-setting of the bearings 6 and maintained by the provision of said end setting plates 21 through which the upper roller shaft ends pass. These plates are simply and positively retained against axial and lateral movement by the guide grooves in the mounting brackets and by making the grooves 22 sufficiently wide the plates automatically assume the required angular position.

The edges of the plates 21 located in grooves 22 in the aforesaid mounting brackets 7 may be arranged for shims or other adjusting means to be associated to provide lateral adjustment of the plates. For example, shims may initially be located on one or both sides of a plate 21 in the groove or grooves to allow interchangement of shims for plate adjustment laterally but in all cases the plates 21 must have only enough working clearance for vertical adjustment and no side movement in operation. Alternatively, the plates or the shaft bearings, may have other means for adjusting the roller axes in relation to the axis of the other roller. If desired, the guide grooves 22 may be in adjustable channel members 23 held by set screws 24 as shown in FIG. 3.

The above constructions show simple ways of allowing the bearings 6 to assume a required angularity but other constructions may be used. As shown in FIG. 4 the plate 21a is furnished with an axially curved hole to receive the swivel bearing part 25 of a bearing 6. Alternatively, the plate may have a cup-shaped hole or such a shaped recess to a clear hole for a complementary shoulder on the bearing 6 to enter.

As rollers of this type sometimes require to be separated, means are furnished for lifting the upper roller 2 away from the lower roller 1. Such means may be operated when the loading force has been removed or reduced, or of such a construction as to lift the roller against the loading pressure. Conveniently, a rod-like member 26 is journalled in each bearing bracket 7 beneath the outer part of the bearing 6 (or it may be beneath the aforesaid setting plate, or adjacent shaft end of the upper roller). This rod-like member is furnished intermeditae its ends with a recess or flat 27 inmmediately on its upper side so that the rod is normally out of contact with said bearing or other part. When the rod-like member is rotated axially the semi-circular part of the shaft will automatically engage and lift the bearing, plate and shaft end and thus the roller, say by an amount equal to the difference between the distance from the member axis and the flat face and the normal radius of the rod. The rod is given this rotation through 180 degrees by providing means on its end such as a lever 28 which is cranked outwardly for ease in gripping.

With the above arrangement each lifting member 26 will be operated separately although they could be linked together to operate simultaneously.

It will be understood that instead of providing a straight rod 26 with a reduced part of substantially D-section forming in effect a cam, the rod may have a cam fixed or formed thereon or have an eccentric part to achieve the same thrusting action on the bearing or shaft end.

A thrust ball bearing is placed at that end of each of the rollers which, because of offsetting, is pushed by a force component against its bearing, 4, 6 located in mounting bracket 7.

What I claim is:

1. In a pressure roller assembly, the combination comprising first and second rollers having rolling engagement with each other and including bearing shafts at the opposite ends thereof, the longitudinal axes of said rollers being set at an angle to each other, bearings receiving said bearing shafts, each of said bearings for each shaft of said first roller including a setting plate integral therewith and said bearings for the shafts of said first roller being offset laterally in opposite directions a predetermined distance from the longitudinal axis of said second roller, a mounting bracket for each of said setting plates, each said mounting bracket including a pair of vertically extending grooves arranged in fixed positions in confronting spaced relation and receiving its corresponding bearing setting plate, and each said pair of fixed grooves serving to positively retain the bearing setting plate correlated thereto against both axial and lateral movements thereby limiting movement of said setting plates and hence said first roller to motion in a direction towards or away from said second roller, and means applying a pressure to said setting plates to load said first roller against said second roller.

2. A pressure roller assembly as defined in claim 1 wherein the longitudinal axes of said rollers cross each other midway between the opposite ends of the rollers, and the bearings for said second roller occupy fixed positions.

3. A pressure roller assembly as defined in claim 1 and which further includes means for separating said first roller from said second roller, said roller separating means comprising a pair of elongated thrust members oriented such that their longitudinal axes are generally transverse to the longitudinal axis of said first roller and mounted respectively at the bearing shafts of said first roller, each said thrust member being rotatable on its longitudinal axis through at least a part of a complete revolution and including a thrust portion intermediate the ends thereof adjacent the corresponding bearing shaft, and means for effecting rotation of said thrust members so that the thrust portions thereof apply a thrust to the corresponding bearing shafts in such direction as to move said first roller a predetermined distance away from said second roller.

4. A pressure roller assembly as defined in claim 3 wherein each of said elongated thrust members includes a substantially flat clearance recess formed at a part intermediate the ends thereof which establishes a substantially D-shaped configuration for this part of said thrust member whereby upon rotation of said thrust member the arcuate peripheral portion thereof opposite said flat clearance recess will apply said thrust to the bearing shaft correlated thereto.

References Cited in the file of this patent

UNITED STATES PATENTS

| | | |
|---|---|---|
| 1,261,903 | Brown | Apr. 9, 1918 |
| 2,762,295 | Varga | Sept. 11, 1956 |